(12) United States Patent
Olesen

(10) Patent No.: US 8,348,611 B2
(45) Date of Patent: Jan. 8, 2013

(54) WIND TURBINE HAVING A SENSOR SYSTEM FOR DETECTING DEFORMATION IN A WIND TURBINE ROTOR BLADE AND CORRESPONDING METHOD

(75) Inventor: Ib Olesen, Aarhus N (DK)

(73) Assignee: Vestas Wind Systems A/S, Aurhus N (DK)

(*) Notice: Subject to any disclaimer, the term of this patent is extended or adjusted under 35 U.S.C. 154(b) by 838 days.

(21) Appl. No.: 12/493,902

(22) Filed: Jun. 29, 2009

(65) Prior Publication Data

US 2010/0054935 A1 Mar. 4, 2010

Related U.S. Application Data

(60) Provisional application No. 61/133,691, filed on Jul. 1, 2008.

(30) Foreign Application Priority Data

Jul. 1, 2008 (GB) .................................. 0812037.0

(51) Int. Cl.
  *F03D 11/00* (2006.01)
(52) U.S. Cl. ........................................ 416/61
(58) Field of Classification Search ........................ None
  See application file for complete search history.

(56) References Cited

U.S. PATENT DOCUMENTS

| | | | |
|---|---|---|---|
| 4,387,993 A | 6/1983 | Adrian | |
| 4,671,659 A | 6/1987 | Rempt et al. | |
| 4,912,530 A | 3/1990 | Bessho | |
| 4,996,419 A | 2/1991 | Morey | |
| 5,009,505 A | 4/1991 | Malvern | |
| 5,094,527 A | 3/1992 | Martin | |
| 5,160,976 A | 11/1992 | Carr et al. | |

(Continued)

FOREIGN PATENT DOCUMENTS

DE 31 48 867 6/1983

(Continued)

OTHER PUBLICATIONS

Understanding Fiber Optics, Chapter 22, *Fiber Optic Sensors*.

(Continued)

*Primary Examiner* — Richard Edgar
(74) *Attorney, Agent, or Firm* — Wood, Herron & Evans, LLP

(57) ABSTRACT

The invention relates to a sensor system and method for detecting deformation in a wind turbine rotor blade, and particularly to a temperature compensated system and method. A first optic fiber 22b is attached to the rotor blade such that deformation of the component acts on the first optical fiber and causes the optical path length of the fiber to change. A second optic fiber 27 is mounted loosely in the wind turbine component in such a way that it is not subject to deformation. A light source 10, a light detector 11, and a controller 12 input light into the two optical fibers and receive signals from them. Based on the detected light, the controller can determine the optical path length based on the light signals. In different embodiments, the light source varies the input wavelength over a range of wavelengths, provides a multi wavelength light signal, such as a white light source, or inputs a pulsed light signal. In further embodiments, the second optical fiber may be omitted if temperature effects are not significant.

14 Claims, 3 Drawing Sheets

U.S. PATENT DOCUMENTS

| | | | |
|---|---|---|---|
| 5,201,015 | A | 4/1993 | von Bieren et al. |
| 5,250,802 | A | 10/1993 | Runner |
| 5,308,973 | A | 5/1994 | Odoni et al. |
| 5,633,748 | A | 5/1997 | Perez et al. |
| 5,649,035 | A | 7/1997 | Zimmerman et al. |
| 5,726,744 | A | 3/1998 | Ferdinand et al. |
| 5,973,317 | A | 10/1999 | Hay |
| 6,125,216 | A | 9/2000 | Haran et al. |
| 6,301,968 | B1 | 10/2001 | Maruyama et al. |
| 6,586,722 | B1 | 7/2003 | Kenny et al. |
| 6,640,647 | B1 | 11/2003 | Hong et al. |
| 2002/0057436 | A1 | 5/2002 | Skinner et al. |
| 2003/0066356 | A1 | 4/2003 | Kanellopoulos et al. |
| 2003/0127587 | A1 | 7/2003 | Udd et al. |
| 2004/0057828 | A1 | 3/2004 | Bosche |
| 2004/0114850 | A1 | 6/2004 | Dewyntermarty et al. |
| 2005/0088660 | A1 | 4/2005 | Ronnekleiv |
| 2005/0276696 | A1 | 12/2005 | LeMieux |
| 2006/0133933 | A1* | 6/2006 | Wobben ............... 416/61 |
| 2006/0285813 | A1 | 12/2006 | Ferguson |
| 2007/0223004 | A1 | 9/2007 | Baillon et al. |
| 2007/0284112 | A1 | 12/2007 | Magne et al. |
| 2008/0013879 | A1 | 1/2008 | Mossman |
| 2008/0317598 | A1 | 12/2008 | Barbu et al. |
| 2009/0097976 | A1 | 4/2009 | Driver et al. |

FOREIGN PATENT DOCUMENTS

| | | |
|---|---|---|
| DE | 253669 | 1/1988 |
| DE | 195 24 036 | 7/1996 |
| DE | 199 27 015 | 12/2000 |
| DE | 202 06 704 | 8/2002 |
| DE | 101 60 522 | 6/2003 |
| DE | 103 15 676 | 11/2004 |
| EP | 0640824 | 3/1995 |
| EP | 0 857 291 | 5/1997 |
| EP | 0 984 243 | 3/2000 |
| EP | 1148324 | 10/2001 |
| EP | 1 249 692 | 10/2002 |
| EP | 1 359 321 | 11/2003 |
| EP | 1359321 | 11/2003 |
| EP | 1 466 827 | 10/2004 |
| EP | 1 586 854 | 10/2005 |
| EP | 1 770 278 | 4/2007 |
| EP | 1 780 523 | 5/2007 |
| EP | 1780523 | 5/2007 |
| EP | 1 873 395 | 1/2008 |
| EP | 1 911 968 | 4/2008 |
| EP | 2 025 929 | 2/2009 |
| EP | 2 075 462 | 7/2009 |
| FR | 2707754 | 1/1995 |
| GB | 2 284 256 | 5/1995 |
| GB | 2326471 | 12/1998 |
| GB | 2 398 841 | 9/2004 |
| GB | 2409517 | 6/2005 |
| GB | 2 421 075 | 6/2006 |
| GB | 2 428 748 | 2/2007 |
| GB | 2 440 953 | 2/2008 |
| GB | 2 440 954 | 2/2008 |
| GB | 2440953 | 2/2008 |
| GB | 2440954 | 2/2008 |
| GB | 2440955 | 2/2008 |
| GB | 2466433 | 6/2010 |
| JP | 55069006 | 5/1980 |
| JP | 58-153107 | 9/1983 |
| JP | 60100707 | 6/1985 |
| JP | 1-069922 | 3/1989 |
| JP | 6-117914 | 4/1994 |
| JP | 2000111319 | 4/2000 |
| JP | 2003302536 | 10/2003 |
| JP | 2007114072 | 5/2007 |
| LV | 11378 | 8/1996 |
| LV | 11389 | 8/1996 |
| SU | 577394 | 1/1977 |
| SU | 780 654 | 3/1996 |
| WO | WO97/15805 | 5/1997 |
| WO | WO00/23764 | 4/2000 |
| WO | WO00/28294 | 5/2000 |
| WO | WO0039548 | 7/2000 |
| WO | WO01/33075 | 5/2001 |
| WO | 02/053910 | 7/2002 |
| WO | 03/076887 | 9/2003 |
| WO | WO2005/024349 | 3/2005 |
| WO | 2005/071382 | 8/2005 |
| WO | 2005/071383 | 8/2005 |
| WO | WO2005/071382 | 8/2005 |
| WO | 2006/021751 | 3/2006 |
| WO | 2006/063990 | 6/2006 |
| WO | 2007/099290 | 9/2007 |
| WO | 2007/104306 | 9/2007 |
| WO | WO2008/101496 | 8/2008 |
| WO | 2009/046717 | 4/2009 |

OTHER PUBLICATIONS

Lefebvre, et al., Automated manufacturing of fiber Bragg grating arrays (2006).

Mike Walker; Combined Search and Examination Report issued in Great Britain Application No. GB1001855.4; Mar. 22, 2010; 7 pages; Great Britain Intellectual Property Office.

Tony Oldershaw; Combined Search and Examination Report issued in Great Britain Application No. GB0817341.1; Jan. 12, 2009; 4 pages; Great Britain Intellectual Property Office.

David Biloen; International Search Report and Written Opinion issued in International Application No. PCT/IB2009/007018; Oct. 7, 2010; 6 pages; European Patent Office.

Lars Jakobsson; International Search Report issued in International Application No. PCT/NO03/00087; Jun. 10, 2003; 3 pages; European Patent Office.

Tony Oldershaw; Combined Search and Examination Report issued in Great Britain Application No. GB0822930.4; Mar. 26, 2009; 5 pages; Great Britain Intellectual Property Office.

Christopher Smith; Search Report issued in Great Britain Application No. GB0814651.6; Dec. 4, 2008; 1 page; Great Britain Intellectual Property Office.

Tony Oldershaw; Examination Report issued in Great Britain Application No. GB0814651.6; May 1, 2009; 2 pages; Great Britain Intellectual Property Office.

Gareth John; Search Report issued in Great Britain Application No. GB0812037.0; Sep. 16, 2008; 4 pages; Great Britain Intellectual Property Office.

James Paddock; Combined Search and Examination Report issued in Great Britain Application No. GB0913739.9; Nov. 30, 2009; 4 pages; Great Britain Intellectual Property Office.

Daniel Jones; Combined Search and Examination Report issued in Great Britain Application No. GB1004162.2; Sep. 13, 2010; 8 pages; Great Britain Intellectual Property Office.

P. Ganci; International Search Report issued in International Application No. PCT/GB96/02606; Jan. 28, 1997; 2 pages; European Patent Office.

Robert MacDonald; Combined Search and Examination Report issued in Great Britain Application No. GB0812258.2; Nov. 7, 2008; 6 pages; Great Britain Intellectual Property Office.

\* cited by examiner

WIND TURBINE HAVING A SENSOR SYSTEM FOR DETECTING DEFORMATION IN A WIND TURBINE ROTOR BLADE AND CORRESPONDING METHOD

This application claims priority from U.S. Provisional Patent Application Ser. No. 61/133,691 which was filed on Jul. 1, 2008 and GB 0812037.0 which was filed on Jul. 1, 2008.

BACKGROUND OF THE INVENTION

The invention relates to a wind turbine having a non-FBG, optic fibre sensor system and method for detecting deformation of a wind turbine rotor blade, and particularly to a temperature compensated system and method.

Wind turbine components are subject to deformation or strain from a number of sources, such as the accumulation of particulates like dirt or ice, their own weight, and the force exerted by the wind itself. Consequently, it is important that the strain on components be monitored to ensure that they remain fit to operate over their intended working lives. Wind turbine rotor blades are particularly susceptible to such phenomena.

It is known to detect the strain on wind turbine components using Fibre Bragg Grating (FBG) sensors, such as those described in patent applications GB 4640953, GB 4640954 and GB 4640955. An FBG sensor is an optical fibre in which an optical grating is formed. The grating itself is typically a periodic variation in the refractive index of the fibre, tuned to reflect a particular wavelength of light.

The part of the optical fibre having the grating is attached to the region of the wind turbine component where the strain is to be measured. It is attached in such a way that any deformation or strain experienced by the component is transmitted to the fibre and to the grating. Deformation and strain causes the spacing of the grating to change, and causes a detectable change in the wavelength of light reflected back by the grating. Various arrangements are known for inserting light into the FBG sensors and for extracting and analysing the output.

FBG sensors pose a number of disadvantages. Forming the grating in the fibre is costly, typically requiring the removal of the optic fibre coating, and subsequent re-coating. FBG sensors also are typically site specific, and only sense deformation at the location of the grating.

The paper entitled "Fatigue strength of glass reinforced polyester (GRP) laminates with embedded optical fibres" by Alfredo Guemes and Jose M Menendez, published at the Third ICIM/ECSSM '96 at Lyon, ISBN 0-8194-2165-0/96 discloses an alternative technique for determining the deformation of a wind turbine component, based on interferometric techniques. Incident light is input to two optical fibres and subsequently recombined to give an interference pattern based on a Michelson Interferometer arrangement. As one of the optical fibres is subject to strain, the resulting interference will depend on the strain.

We have appreciated that there is a need for a more robust and cost effective solution for detecting deformation of a wind turbine component, that is able to address both large and small deformations with accuracy.

SUMMARY OF THE INVENTION

According to a first preferred aspect of the invention there is provided a wind turbine comprising a temperature compensated optical sensor system for detecting the deformation of a wind turbine rotor blade, the system comprising: a first optical fibre providing a deformation measurement optical path, the first optical fibre operatively attached to the wind turbine rotor blade such that deformation of the rotor blade acts on the first optical fibre and causes the length of the deformation measurement optical path to change; a second optical fibre providing a non-deformation measurement optical path, the second optical fibre operatively attached to the rotor blade such that it is isolated from deformation of the rotor blade; a light source for inputting light into one end of the first and second optical fibres; a light detector for receiving light that has passed along the deformation measurement and non-deformation measurement optical paths, and for providing an output to the controller indicating the intensity of the received light; a controller coupled to the light detector for determining, based on the detected light, the difference in lengths of the deformation measurement and non-deformation measurement optical paths.

The temperature compensated sensor provides an accurate technique for determining the deformation or strain on a wind turbine rotor blade. The sensor calculates the difference in length between the first and second fibres, and so takes into account thermal drift of the sensor without additional processing being necessary. Furthermore, as the deformation is based on the determination of difference in path lengths, the sensor is sensitive to deformation occurring over the whole length of the optic fibre, as well as to isolated but unpredictable locations. This provides significant advantages over FBG sensors that rely on detecting deformation at the specific location in which the grating is formed.

In one example embodiment, the sensor comprises: a mirror terminating the first optical fibre; a mirror terminating the second optical fibre; and an optical coupler for splitting the light received from the light source into the deformation measurement and non-deformation measurement optical paths, and for receiving and combining the light reflected from first and second optical fibres.

This arrangement allows the sensor to be implemented using only a small number of optical components, and therefore provides advantages in cost, installation and maintenance.

Further, the optical paths lengths of the first and second fibre are preferably long in comparison to other optical lengths in the system, as this gives greater accuracy of the sensor.

In some aspects, the controller may comprise: a light source controller, coupled to the light source, for varying the wavelength of light input to the optical fibre; a memory for storing the output received from the light detector; an analyser for detecting a cyclical value of the intensity of the received light, as the wavelength is varied; and a counting unit, coupled to the intensity detection circuit, for counting the number of times the cyclical value of intensity is detected.

This sensor allows for measurement of relatively large fibre differences (say 10 mm or more) with a variation in wavelength of just a few nanometers. The sensor is also sensitive, as a long fibre (say 0.5 m or more) gives a large number of interference cycles for each nanometer change.

The light source controller may be arranged to vary the wavelength of light over the range of 0.5% to 5% of the initial wavelength. Depending on the variation chosen, the length measurement can be made with greater precision, and in quicker time.

In alternative arrangement for some aspects, the controller may comprise: a light source controller, coupled to the light source, for causing the light to emit a pulsed light signal at a first time; and a timer for measuring the time elapsed between the first time and a time at which the pulse is received at the light detector. This arrangement can be simpler to implement, as it avoids complications arising from varying the wavelength of the light source. It is also as quick as the length of time it takes the pulse of light to travel along the fibre.

In alternative arrangement for some aspects, the light source is a broad spectrum light source arranged to emit light at a plurality of wavelengths, and the light detector comprises an interrogator for detecting received light over a plurality of wavelengths, and wherein the controller comprises an analyser for detecting a cyclical value of the intensity of the received light. White light measurement techniques are optimal for relatively small fibre displacements such 1 mm to 10 mm.

Preferably, the cyclical value is a maximum and/or minimum in the intensity of the received light as this simplifies detection.

In a second preferred aspect of the invention, there is provided a wind turbine comprising an optical sensor system for detecting the deformation of a wind turbine rotor blade, the system comprising: an optical fibre having a first optical path provided in a measurement portion of the fibre, the fibre operatively attached to the rotor blade such that deformation of the rotor blade acts on the measurement portion of optical fibre and causes the length of the first optical path to change; a light source for inputting light into one end of the fibre; a light detector for receiving light that has passed along the first optical path, and for providing an output to the controller indicating the intensity of the received light; a controller coupled to the light detector for determining, based on the detected light, the length of the first optical path.

The second aspect of the invention can be used where temperature effects are unlikely to be significant. As the calculation of deformation is based on the determination of the path lengths of the measurement portion of the optic fibre, the sensor is sensitive to deformation occurring over the whole length of the optic fibre, and to isolated but unpredictable locations. This provides significant advantages over FBG sensors that rely on detecting deformation at the specific location in which the grating is formed, and requires only a single optic fibre to be attached to the component for measurement purposes.

In the second aspect of the invention, the optical fibre preferably comprises a second optical path, separate from the measurement portion of the optical fibre and not subject to deformation of the rotor blade. This path provides a comparison signal for use in the calculation method, either an undelayed phase for use in the in wavelength variation method, or a reference time signal indicating the path length of the optical components in the sensor not used in the in measurement portion of the fibre.

In one embodiment, the sensor comprises: a light splitting device coupled to the light source for splitting the light into the first and second optical paths; and a light adding device arranged to receive the light from the measurement portion of the optical path and directly from the light splitting device.

In a further embodiment, the second optical path includes a non-deformation measurement portion of optical fibre, separate to the measuring portion, and a mirror terminating the non-deformation measurement optical fibre portion, and the sensor comprises: a mirror terminating the measurement portion of the optical fibre; and an optical coupler for splitting the light received from the light source between the measurement and non-measurement portions of the fibre, and for receiving and combining the light reflected from both measurement and non-deformation measurement portions of the fibre.

In the second aspect, the non-measurement portion of the fibre is isolated from deformation of the rotor blade to provide for temperature compensation, the lengths of the measurement and non-measurement portions of the optical fibre and the measurement portion of the fibre being long in comparison to other optical distances in the sensor.

In a further embodiment the system comprises: a partial mirror for splitting the light into the first and second optical paths; and a mirror terminating the measurement portion of the optical fibre; wherein the partial mirror allows the light reflected from the measurement portion of the optic fibre to pass through to the light detector.

A corresponding method is provided.

BRIEF DESCRIPTION OF THE DRAWINGS

Preferred embodiments of the invention will now be described, by way of example, and with reference to the drawings in which.

DETAILED DESCRIPTION OF PREFERRED EMBODIMENTS

Figure 1:
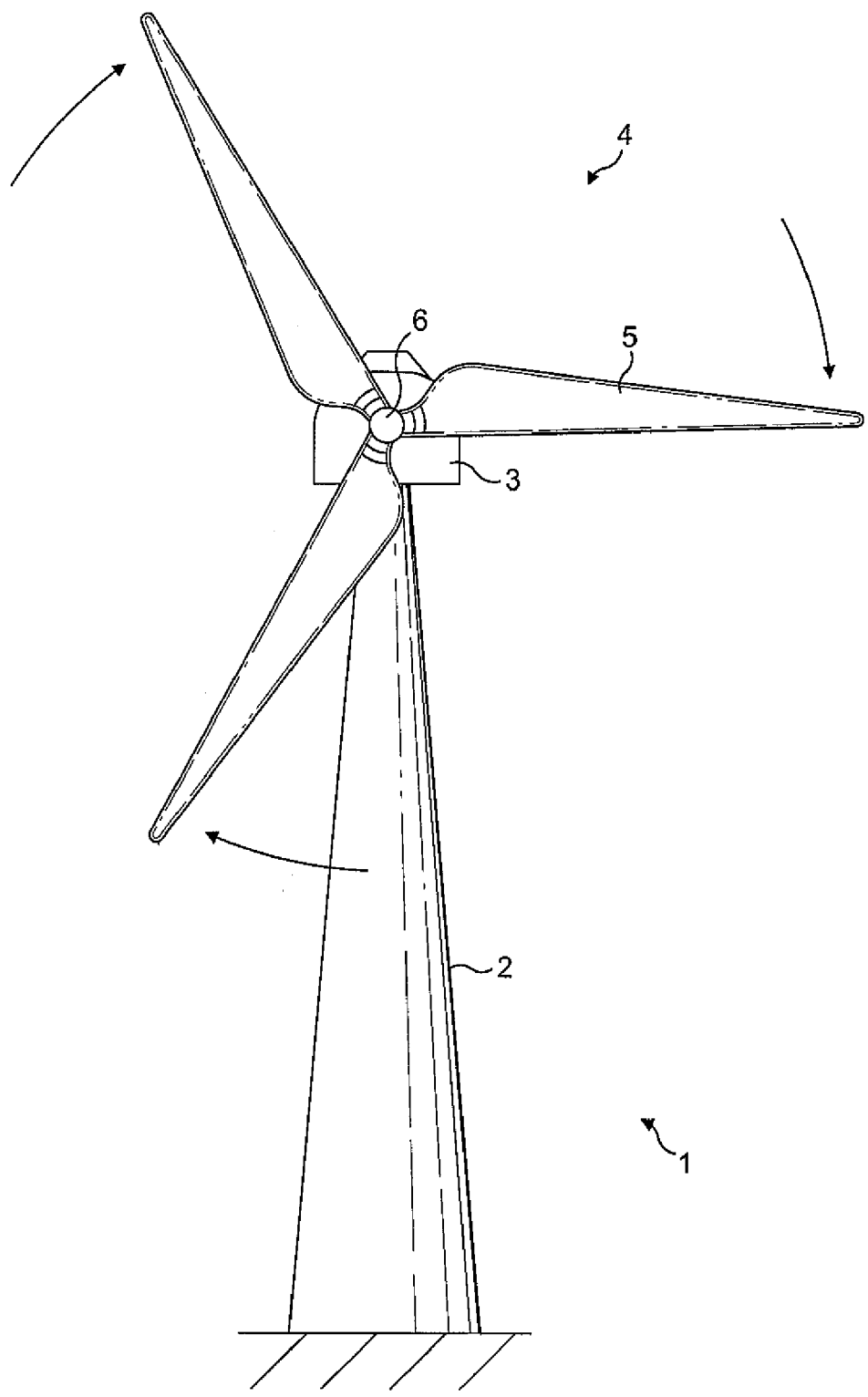
FIG. 1 illustrates a known wind turbine.

FIG. 1 illustrates a wind turbine 1, comprising a wind turbine tower 2 on which a wind turbine nacelle 3 is mounted. A wind turbine rotor 4 comprising at least one wind turbine blade 5 is mounted on a hub 6. The hub 6 is connected to the nacelle 3 through a low speed shaft (not shown) extending from the nacelle front. The wind turbine illustrated in FIG. 1 may be a small model intended from domestic or light utility usage, or may be a large model used, such as those that are suitable for use in large scale electricity generation on a wind farm for example. In the latter case, the diameter of the rotor could be as large as 100 meters or more.

Figure 2:
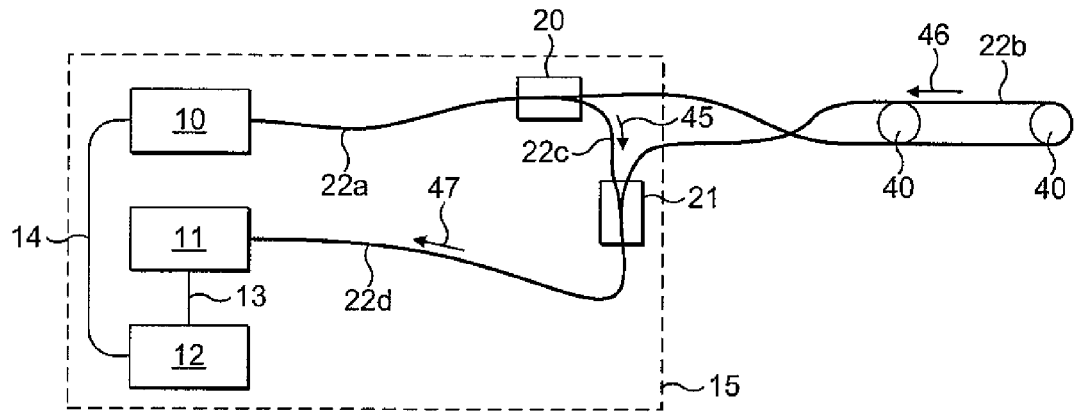
FIG. 2. illustrates a first example implementation of the invention.

FIG. 2 illustrates a first embodiment of the sensor. The sensor comprises a light emitting device 10, such as an LED, laser, halogen or metal halide source, a light collecting measuring device 12, such as a photo-sensor, and an optical fibre 22. The light emitting device is connected to one end of the fibre optic cable to input light into the fibre, and the light measuring device connected to the other to receive light transmitted along the fibre. A controller 12 is connected to both light emitting device 10 and light measuring device 11, by connections 13 and 14, such as wires or cables. Components 10 to 14 may be housed in a mounting box 15 for easy attachment to the inside or outside of a wind turbine component.

The optical fibre 22 is mounted on or in a wind turbine rotor blade (not shown in FIG. 2) to measure the strain in the rotor blade. In alternative examples it may be mounted on other wind turbine components. Mounting the optical fibre may be achieved by mounts 40 attached to the outside or inside surface of the rotor blade. Other mounting methods would be acceptable as would be known to the skilled person. When the sensor is installed in a wind turbine to measure the strain in the wind turbine blades, it is likely that the mounting box 15 would be situated in the hub 6, and the optic fibre 22 would extend internally within the blade from the hub to the relevant region of the blade to be assessed. In this way, the aerodynamic properties of the blades are not affected by the presence of the sensor. In other locations, the optic fibre sensor may be mounted on the outside of the component.

In FIG. 2, it will be appreciated that the spacing of mounts 40 from one another is determined by the dimensions of the turbine component or region of the turbine component that is to be monitored by the sensor. As the component experiences strain or deformation, mounts 40 will move slightly, stretching the optical fibre 22 and increasing the length of the optical path. The optical fibre may therefore be wound around mounts 40 more than once, so that the stretch operates along a greater length of fibre. This causes a greater increase in optical path length and greater sensitivity of the resulting sensor.

The sensor also comprises light splitting device 20 and light adding device 21 located in the path of the optical fibre 22. The optical fibre 22 is connected to input and output portions of the light splitting and adding devices, and is accordingly comprised of separate optical fibre portions 22a, 22b, 22c, and 22d. Although, these portions are separate optical fibres, it is helpful to think of them as a forming a single fibre 22 element 22 for the purpose of the present discussion.

Optical fibre 22b extends around the mounts 40 and is the portion of the fibre subject to strain in the component. It is therefore much longer than portions 22a, 22c and 22d that connect the splitter and the adder to the light emitting device 10 and to the light measuring device 11. It is assumed that the lengths of the fibres 22a, 22c, 22d and 22e result in an essentially negligible delay in the light received from optical source 10. It will be appreciated that the splitter 20 and adder 21, as well as optical fibres 22a, 22c and 22d could be housed in the mounting box 15 for ease of installation.

The strain sensor operates by detecting the length of the optical fibre. Light emitting device 10 inputs light having a single uniform wavelength into the optical fibre 22a.

First portion 22a connects the light emitting device 10 to the input terminal of the light splitting device or optical splitter. The optical splitter divides the light received at its input terminal into two equal output signals. Second optical fibre portion 22b is connected to one output terminal of the splitter 20 and therefore receives a light signal 45, having a first phase, from the light emitting device 10 and fibre portion 22a. The second optical fibre portion 22b extends around the mounts 40 and is the portion of the fibre subject to strain in the component. Its other end connects to the input terminal of light adding device 21. It will be appreciated that optical splitter and adder could be provided in a single optical coupler, and are shown separately here for clarity.

The other input terminal of light adding device 21 is connected to optical fibre 22c, which in turn is connected to the other output terminal of splitter 20. At one terminal, the optical adding device therefore receives the light signal 45, and at the other it receives light signal 46, having a second phase. The second phase is different to the first phase, as the light signal 46 has traveled along the longer optical fibre portion 22b. In light adding device 21, the two light signals 45 and 46 are added together, and the resulting light signal 47 is sent to light measuring device 11, via optical fibre 22d connect to the output terminal of adder 21.

The light measuring device detects the intensity of the light signal 47 received at its input terminal. The intensity of the received light 47 will depend on the relative phases of the two light signals 45 and 47, and whether their relative phases result in constructive or destructive interference.

When the optical fibre 22b is in an unstrained state, the intensity of the light received at the input to light detector 11 is determined. This intensity may be considered a zero or a rest value for the sensor.

Further, as the relative phase of the two light signals 45 and 46 is a function of the wavelength of light and the optical path length along fibre 22b, and to a lesser extent fibres 22c and 22d, the resting intensity value of the sensor may be tuned to a desired value by adjusting the wavelength of the input light signal 45.

In a first preferred technique for determining the length of the fibre, the controller 12 controls the light emitting device 10, to slowly vary the wavelength of the input light signal 45. It is preferred if the total variation in wavelength during the sensing process is small, say 1000 parts per million, or 0.1%. As the wavelength is varied, the controller monitors the intensity at the light detector 21, and detects the cyclical variation in intensity caused by the change in phase. The controller counts the number of times the relative phase of the two signals 45 and 46 changes by 360 degrees, a complete cycle. The controller 12 may count each cycle in phase by determining how many times the maximum (or minimum) intensity is reached.

After the controller 12 has completed varying the wavelength, the total number of phase cycles detected is used to determine the length of the optical fibre. For example, if varying the wavelength of the input light 45 by 0.1% results in detection of 500 a complete phase cycles, then the length of the fibre can be determined, to a reasonable degree of accuracy, as:

$$\text{length} = \text{number of phase cycles} \times (\text{variation})^{-1} \times \text{wavelength}$$
$$= 500 \times (0.001)^{-1} \times \text{wavelength}$$

Thus, for red light in the fibre with a wavelength of 700 nm, the length of the fibre can be determined as:

$$= 500000 \times 7 \times 10^{-7}$$

$$= 0.35 \text{ m}.$$

This equation can be understood by considering that before the change in wavelength occurs, at any given instant in time, the number of light waves in the optical fibre 22b is equal to the length of the fibre divided by the wavelength. If the wavelength of the input light is increased by 0.1%, then the number of waves that can be accommodated in the optical fibre 22b will decrease slightly. That is to say some of the original waves will be 'pushed' out of the fibre as the wavelength changes. For example, if the length of the cable was 1 m and the wavelength of the original light signal was 1 µm, then $1 \times 10^6$ waves would have been accommodated originally in the fibre. An increase in the wavelength of the light of 0.1% would mean the number of waves accommodated after the increase is $1 \times 10^6$ divided by 1.001, or 999,001.

The number of cycles detected at detector 11 is a measure of the number of waves that can no longer be accommodated in the fibre 22b because of the change in wavelength.

It is known from the initial configuration of the sensor that the 500 waves correspond to 0.1% of the total number of waves in the fibre. Thus, to a good approximation, the total number of waves in the fibre before the wavelength increased was 500×0.1-1 or 500000. The length of the fibre is then calculated by multiplying the number of waves by the wavelength.

It may be advantageous to ensure that the polarisation of the light signals is substantially the same when they are added, to ensure that they are not orthogonal in polarisation and will therefore interfere strongly. Various techniques are known for achieving this in the art.

Figure 3:
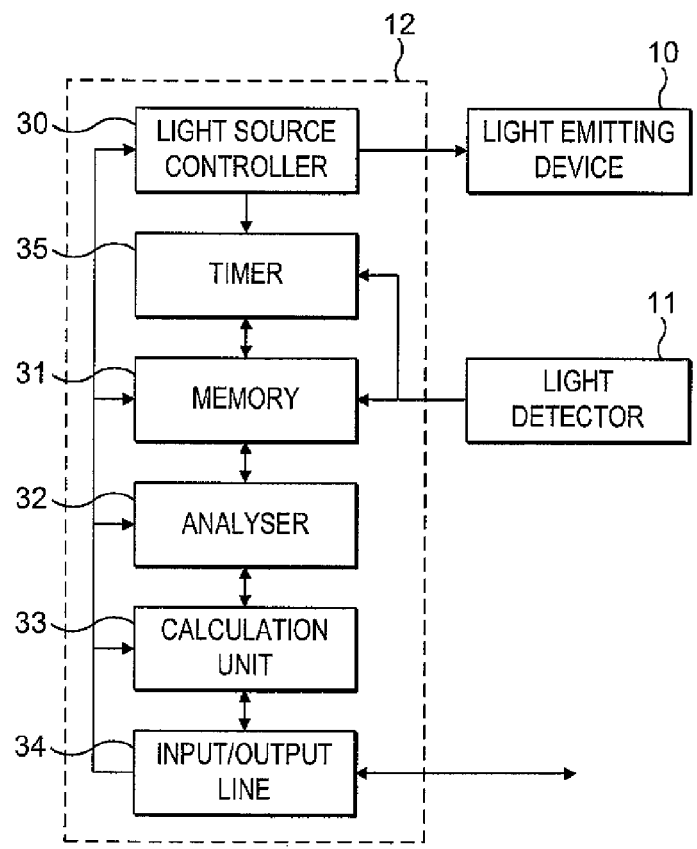
FIG. 3. illustrates an example implementation of a controller shown in FIG. 2.

FIG. 3 illustrates the controller in more detail. The controller comprises, a light source controller 30, coupled to the tunable light source. A control signal from the light source controller is used to vary the wavelength of light input to the optical fibre, and to control the length of time over which the variation occurs.

The controller also comprises a memory 31 for storing the intensity output received from the light detector as the wavelength of the light is varied. An analyser 32, such as a processor, and coupled to the memory is provided to analyse the intensity variation stored in memory and determine how many full phase cycles are present. The analyser 32 does this by detecting a cyclical value in the intensity of the received light, as the wavelength is varied. Preferably, the cyclical value is a maximum or minimum, allowing standard graphical processing techniques to be used. Alternatively, any predetermined value may be used providing that it is taken into account any value other than the maximum or minimum will occur twice each cycle.

A calculation unit 33 is coupled to the analyser to count and store the number of cycles detected and to calculate the resulting length of the fibre. It will be appreciated that knowing the starting intensity of the light and the final intensity allows the calculation unit to use a fraction number of cycles in the calculation, not just an integer number.

The controller comprises an input/output line 34 for receiving and transmitting instructions or data to and from a remote site, such as a monitoring station. The input/output line may be wired or wireless.

Although the controller has been described in terms of separate hardware components, this is solely to illustrate the functionality of the controller in a clear manner. It would be possible in practice to provide the hardware components as software or hardware, or as any combination of single or combined components.

In some applications it is required for the controller to calculate determine the fibre length around 40 times a second. For this reason, the controller may also comprise a timer 35. Other control systems in the wind turbine 1 can use this data to make real time adjustments to operating parameters, such as the direction of the hub, the yaw angle of the blades and so on. The input/output line 34 could be used for example to carry control signals from the controller 12 to a blade control system.

In applications where determining the fibre length is to be carried out many times a second, it is important to select the operating parameters to avoid limiting performance. For example, assuming a constant speed for varying the wavelength of the input light signal 45, larger variations will take more time to carry out, and will result in a larger number of detected phase cycles.

The variation in the input light is also limited by the accuracy of the light emitting device. For very small changes such as 0.1% it can in practice be difficult to ensure that the input wavelength is exactly at the desired value. Small inaccuracies in the final wavelength variation can greatly affect the accuracy of the final calculation due to the inaccuracy being multiplied in the expression given. For this reason, assuming a working range for the wavelength of the input light of between 200 nm 1500 nm, an advantageous range of variation amounts is 0.5% to 5%. Other ranges, including for example the value of 0.1%, are possible where speed of calculation is not a factor and where operational parameters of the sensor apparatus, particularly the light source allow. Light sources of higher frequency and lower wavelength are preferred for applications where a sensor with high resolution is required, as the wavelength of the light limits the resolution of the length, based on number of cycles.

The first example above has been described in some detail in order to outline the overall sensing principle. However, the first example has a number of drawbacks, not least that it requires a two separate cables 22b and 22c to carry the light signals 45 and 46. This causes some difficulty of installation, and as the two cables will typically be located at different parts of the component may expose the cables to different environment effects leading to inconsistencies and errors in the calculations. The second and third example implementations therefore differ by having the two light signals 45 and 46 travel in the same optical fibre, after optical splitter 20.

Figure 4:
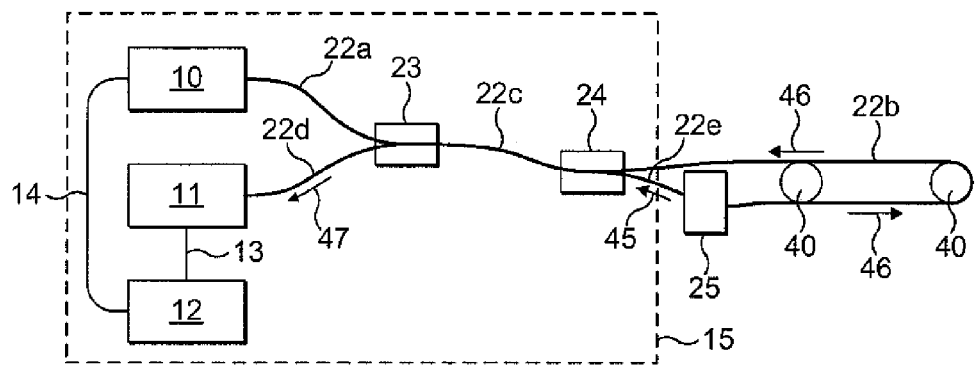
FIG. 4. illustrates a second example implementation.

FIG. 4 illustrates a second example implementation. The elements of the drawing having the same function as those in FIG. 2 have been given the same reference numbers. Instead of light splitting device 20, the second example comprises first and second optical couplers 23 and 24. The first optical coupler is connected to optical fibre 22a to receive the input light 45, and has optical fibre 22c connected to its two way input/output terminal. Optical fibre 22d is connected between a further output terminal of the coupler and to the light measuring device 11. Similarly, the other end of optical fibre 22c is connected to a two way input/output terminal of the second optical coupler 24. The second optical coupler splits the light received at from optic fibre 22c into two equal portions. Optical fibres 22b and 22e are connected to further two way input/output terminals of the second optical coupler and receive the two light portions. The end of the both optical fibres 22b and 22e are connected to a reflecting mirror 25. This may be a single two sided reflecting mirror or two separate reflecting mirrors as desired. The reflectivity of mirror 25 is 100% or as close to 100% as practical. As before optical fibre 22b is mounted on mounts 40 and experiences the strain on the wind turbine component. Optical fibres 22b and 22e do not communicate with each other.

In the second example implementation, light signal 45 is received at the light measuring device by passing along a path from the light emitting device, though the first optical coupler 21, the optical fibre 22c, and the second optical coupler 24, to the optical fibre 22e. The light signal 45 is reflected from the mirror 25, and travels back along the same path to the first optical coupler 23 where it is passed to light measuring device 11 via optical fibre 22d.

Light signal 45 is also received at the input to the optical fibre 22b, and having passed along the fibre to be reflected at mirror 24 passes back along the fibre to the input/output terminal of the second optical coupler as light signal 46. The second optical coupler combines the light signal 46 having the shifted wavelength with the signal input into the optic fibre 22c. The combined signal 47 then follows the same path back to the light measuring device as noted above.

The sensing technique is the same as that described above for the first example implementation, except that the length of the fibre 22b will now appear to be double the actual value.

Figure 5:
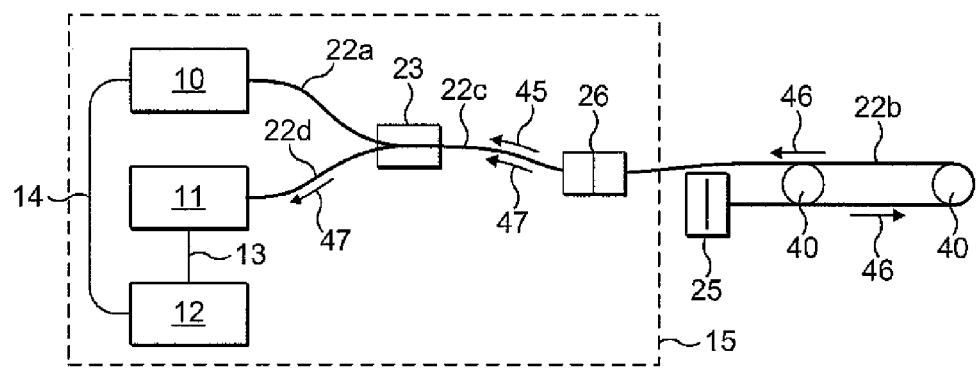
FIG. 5. illustrates a third example implementation.

The third example implementation, illustrated in FIG. 5, is a simplified version of the second example, and advantageously requires fewer optical elements. The second optical coupler 24 is replaced by partial mirror 26, and the optic fibre 22e is omitted altogether. In this example, first light signal 45 is obtained by reflection of light in the optical fibre 22c at the partial mirror 26. This light has not passed along fibre 22b and so is not phase delayed in comparison with the source or emitter 10. The partial mirror 26 advantageously reflects 50% of the incident light or less.

The light that is transmitted by partial mirror travels along the fibre 22b, and is reflected back at mirror 25. This reflected light is received at the partial mirror and is partially transmitted as phase delayed light 46. As not all of the phase delayed light is transmitted by the partial mirror, some will be reflected back again and again in the fibre 22b constituting a source of noise. For this reason the reflectivity of the two surfaces of the partial mirror is adjusted to ensure as equal a ratio of signal 45 to 46 as possible, and to minimise the amount of noise.

Figure 6:
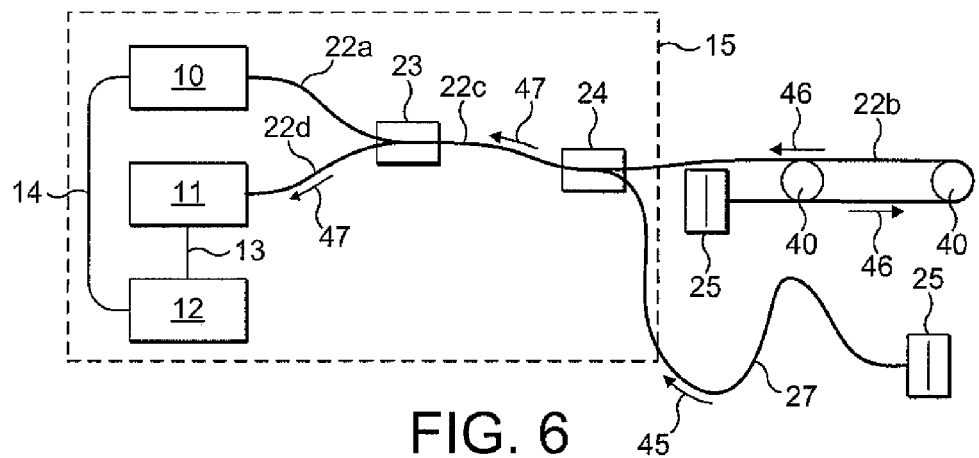
FIG. 6 illustrates a fourth example implementation, and a preferred embodiment of a temperature compensated sensor.

None of the example implementations described above provide a way of addressing changes in temperature or other environmental factors that may affect the optical path length of the fibre 22b and the accuracy of the results. FIG. 6 therefore illustrates a sensor in which a second optic fibre 27 is provided for compensating environmental effects, such as thermal expansion.

The arrangement is similar to that described above for the sensor of FIG. 2, except that the optic fibre 22e is replaced by the second optic fibre 27. The second optic fibre 27 is mounted in the wind turbine component in such a way that it is not subject to strain. Optic fibre 27 ends in a mirror 25. The length of the second fibre optic cable 27 is known at installation.

In this arrangement, the light signals 45 and 46 are received at the light measurement device 11 in the same manner as described above for FIG. 2. However, in the earlier examples, light signal 45 was obtained by making the incident light travel along a much shorter path than the light signal 46 travelling along the longer measuring fibre 22b. It was assumed that the lengths of the fibres 22a, 22c, 22d and 22e were negligible in comparison.

In this example, however, both of the optical fibres 22b and 27 are similar in length and the two light signals will therefore travel along similar optical path lengths. The difference in the path lengths is then equal to the extension of the fibre optic 22b caused by strain on the wind turbine component. Although, thermal expansion will cause a change in length of the optic fibres, it should act on both equally, allowing the difference in length to be taken solely as indicating strain. This arrangement also advantageously allows compensation for any temperature induced change in the speed of light within the fibre.

In this example, the number of cycles counted by the detector therefore indicates the difference in length of the two fibres rather than the total length of the measuring fibre, and can in turn be used to give a value for temperature compensated strain.

Other techniques may be used to measure the length of the optic fibre 22b or the difference in length of the optic fibres 22b and 27. In one example, a pulse of light may be input into optic fibre 22c, and the time taken for the pulse to travel along the two optical paths to the sensor would be recorded. The difference in time between the two pulses received at the detector could be used to determine either the path length of fibre 22b, or the difference in path length between 22b and 27. In this case, the controller illustrated in FIG. 3 also comprises a timer 35.

A further implementation is to input white light into the optic fibre 22a. The optical path length traveled by the light in an optical fibre will be different according to the wavelength of the light. With the four different example embodiment proposed, the different wavelengths of light will be received at the detector at different phases according to the path traveled and will therefore interfere with each other constructively or destructively. The effect is like an interference pattern for a single wavelength of light, and has a sinusoidal shape. It is however a result of the interference of different wavelengths.

The separation between the peaks or troughs of the interference pattern indicates the relative difference in wavelengths that add destructively or constructively due to the different path lengths. Adding white light to input portion of the fibre is analogous to varying the wavelength of the input light over a very broad range, and the difference in wavelength can be expressed as a percentage variation between a first peak or trough and a second consecutive peak or trough.

Consider by way of example, light of wavelength 1000 nm added to two optic fibres having lengths that differ by 1 mm. The 1 mm difference in path length corresponds to 1000 waves. If the signals from both paths were added together the waves would add constructively. A slightly longer or shorter wavelength however would add destructively. In this example destructive interference would require 999.5 or 1000.5 waves in the 1 mm path difference. This number of waves corresponds to wavelengths of 1 mm/999.5=1.0005 μm and 1 mm/1000.5=0.9995 μm. This pattern will therefore repeat with a rate of 1 nm depending on the difference in length of the fibres.

A path difference of 2 mm, would correspond to 2000 waves at a wavelength of 1000 nm. Again, light at this wavelength would add constructively, but light at slightly different wavelengths would add destructively. In this case, destructive interference would require 1999.5 or 2000.5 waves in the path difference, corresponding to wavelengths of 1.00025 μm and 0.99975 μm. This pattern repeats with a rate of 0.5 nm, which is dependent on the difference in length. The difference between constructive and destructive interference is then $$\text{wavelength/number of waves=repeat rate}$$

or, replacing 'number of waves', $$\text{wavelength/(fibre length wavelength)=repeat rate}$$

which can be rearranged to $$\text{fibre length=wavelength}^2\text{/repeat rate}$$

An interrogator is a light detector detects and measures light across a wide spread of wavelengths. Using an interrogator, the resulting interference pattern, in the received white light signal can be measured, and the spacing (repeat rate) between the constructive and destructive parts of the wavelength spectrum determined. These presently allow repeat rates from 20 nm down to 0.1 nm at a wavelength of 1500 nm to be measured.

The above formula is simplified somewhat, as by definition the wavelength is not uniform across the spectrum. Accordingly the repeat rate at different wavelengths will be different. However, by approximating the wavelengths and repeat rates, by averaging over a plurality of values say, a reasonable degree of accuracy in the measurement of fibre length can still be obtained. It will be appreciated that it is not necessary to use white light, but light having a plurality of wavelengths across a sufficiently broad range for the necessary interference pattern to be produced.

The different techniques provide a number of different benefits. Wavelength variation for example allows relatively large fibre differences (say 10 mm or more) with a variation in wavelength of just a few nanometers. Furthermore, the technique is relatively sensitive, as a long fibre (say 0.5 m or more) gives a large number of interference cycles for each nm change.

The time difference measurement technique is may be compared with a kind of radar technique. Measuring delay between the different return signals is possible, but the possible equipment is for the moment quite rare and expensive.

White light measurement can benefit from (might) using interrogators, which are already known for traditional FBG measurement systems, and software to perform the calculation method proposed above. This would be relatively easy to implement. White light measurement technique is optimal for relatively small fibre displacements such 1 mm to 10 mm.

A non FBG sensor system is therefore provided for making accurate measurements of deformation on a wind turbine rotor blade. It is easy to handle and install, and should be cost effective to operate and maintain over its intended life span of 20 years or more. The sensor works just as well, whether it is the whole fibre that is stretched, or just a small fraction that is stretched, as in all cases it is the total length that matters. This makes the mounting less demanding.

The invention has been described with reference to example implementations, purely for the sake of illustration. The invention is not to be limited by these, as many modifications and variations would occur to the skilled person. The invention is to be understood from the claims that follow.

The invention claimed is:

1. A wind turbine comprising a temperature compensated optical sensor system for detecting the deformation of a wind turbine rotor blade, the system comprising:
    a first optical fibre providing a deformation measurement optical path, the first optical fibre operatively attached to the wind turbine rotor blade such that deformation of the wind turbine rotor blade acts on the first optical fibre and causes the length of the deformation measurement optical path to change;
    a second optical fibre providing a non-deformation measurement optical path, the second optical fibre operatively attached to the wind turbine rotor blade such that it is isolated from deformation of the wind turbine rotor blade;
    a light source for inputting light into one end of the first and second optical fibres;
    a light detector for receiving light that has passed along the deformation measurement and non-deformation measurement optical paths, and for providing an output to the controller indicating the intensity of the received light;
    a controller coupled to the light detector for determining, based on the detected light, the difference in lengths of the deformation measurement and non-deformation measurement optical paths;
    a mirror terminating the first optical fibre;
    a mirror terminating the second optical fibre; and
    an optical coupler for splitting the light received from the light source into the deformation measurement and non-deformation measurement optical paths, and for receiving and combining the light reflected from first and second optical fibres.

2. A wind turbine comprising a temperature compensated optical sensor system for detecting the deformation of a wind turbine rotor blade, the system comprising:
    a first optical fibre providing a deformation measurement optical path, the first optical fibre operatively attached to the wind turbine rotor blade such that deformation of the wind turbine rotor blade acts on the first optical fibre and causes the length of the deformation measurement optical path to change;
    a second optical fibre providing a non-deformation measurement optical path, the second optical fibre operatively attached to the wind turbine rotor blade such that it is isolated from deformation of the wind turbine rotor blade;
    a light source for inputting light into one end of the first and second optical fibres;
    a light detector for receiving light that has passed along the deformation measurement and non-deformation measurement optical paths, and for providing an output to the controller indicating the intensity of the received light; and
    a controller coupled to the light detector for determining, based on the detected light, the difference in lengths of the deformation measurement and non-deformation measurement optical paths,
    wherein the optical paths lengths of the first and second fibre are long in comparison to other optical lengths in the system.

3. A wind turbine comprising a temperature compensated optical sensor system for detecting the deformation of a wind turbine rotor blade, the system comprising:
    a first optical fibre providing a deformation measurement optical path, the first optical fibre operatively attached to the wind turbine rotor blade such that deformation of the wind turbine rotor blade acts on the first optical fibre and causes the length of the deformation measurement optical path to change;
    a second optical fibre providing a non-deformation measurement optical path, the second optical fibre operatively attached to the wind turbine rotor blade such that it is isolated from deformation of the wind turbine rotor blade;
    a light source for inputting light into one end of the first and second optical fibres;
    a light detector for receiving light that has passed along the deformation measurement and non-deformation measurement optical paths, and for providing an output to the controller indicating the intensity of the received light; and
    a controller coupled to the light detector for determining, based on the detected light, the difference in lengths of the deformation measurement and non-deformation measurement optical paths,
    wherein the controller comprises:
        a light source controller, coupled to the light source, for varying the wavelength of light input to the optical fibre;
        a memory for storing the output received from the light detector;
        an analyser for detecting a cyclical value of the intensity of the received light, as the wavelength is varied; and
        a calculation unit, coupled to the analyser, for counting the number of times the cyclical value of intensity is detected.

4. The wind turbine of claim 3, where the light source controller is arranged to vary the wavelength of light in the range 0.5% to 5% of the initial wavelength.

5. The wind turbine of claim 3, wherein the cyclical value is a maximum and/or minimum in the intensity of the received light.

6. A wind turbine comprising a temperature compensated optical sensor system for detecting the deformation of a wind turbine rotor blade, the system comprising:
    a first optical fibre providing a deformation measurement optical path, the first optical fibre operatively attached to the wind turbine rotor blade such that deformation of the wind turbine rotor blade acts on the first optical fibre and causes the length of the deformation measurement optical path to change;

a second optical fibre providing a non-deformation measurement optical path, the second optical fibre operatively attached to the wind turbine rotor blade such that it is isolated from deformation of the wind turbine rotor blade;

a light source for inputting light into one end of the first and second optical fibres;

a light detector for receiving light that has passed along the deformation measurement and non-deformation measurement optical paths, and for providing an output to the controller indicating the intensity of the received light; and a controller coupled to the light detector for determining, based on the detected light, the difference in lengths of the deformation measurement and non-deformation measurement optical paths, wherein the controller comprises:
a light source controller, coupled to the light source, for causing the light to emit a pulsed light signal at a first time; and
a timer for measuring the time elapsed between the first time and a time at which the pulse is received at the light detector.

7. A wind turbine comprising a temperature compensated optical sensor system for detecting the deformation of a wind turbine rotor blade, the system comprising:

a first optical fibre providing a deformation measurement optical path, the first optical fibre operatively attached to the wind turbine rotor blade such that deformation of the wind turbine rotor blade acts on the first optical fibre and causes the length of the deformation measurement optical path to change;

a second optical fibre providing a non-deformation measurement optical path, the second optical fibre operatively attached to the wind turbine rotor blade such that it is isolated from deformation of the wind turbine rotor blade;

a light source for inputting light into one end of the first and second optical fibres;

a light detector for receiving light that has passed along the deformation measurement and non-deformation measurement optical paths, and for providing an output to the controller indicating the intensity of the received light; and a controller coupled to the light detector for determining, based on the detected light, the difference in lengths of the deformation measurement and non-deformation measurement optical paths, wherein the light source is a broad spectrum light source arranged to emit light at a plurality of wavelengths, and the light detector comprises an interrogator for detecting received light over a plurality of wavelengths, and wherein the controller comprises an analyser for detecting a cyclical value of the intensity of the received light.

8. A wind turbine comprising an optical sensor system for detecting the deformation of a wind turbine rotor blade, the system comprising:

an optical fibre having a first optical path provided in a measurement portion of the fibre, the fibre operatively attached to the wind turbine rotor blade such that deformation of the wind turbine rotor blade acts on the measurement portion of optical fibre and causes the length of the first optical path to change, wherein the optical fibre comprises a second optical path, separate from the measurement portion of the optical fibre and not subject to deformation of the wind turbine rotor blade;

a light source for inputting light into one end of the fibre;

a light detector for receiving light that has passed along the first optical path, and for providing an output to the controller indicating the intensity of the received light;

a controller coupled to the light detector for determining, based on the detected light, the length of the first optical path;

a light splitting device coupled to the light source for splitting the light into the first and second optical paths; and a light adding device arranged to receive the light from the measurement portion of the optical path and directly from the light splitting device.

9. A wind turbine comprising an optical sensor system for detecting the deformation of a wind turbine rotor blade, the system comprising:

an optical fibre having a first optical path provided in a measurement portion of the fibre, the fibre operatively attached to the wind turbine rotor blade such that deformation of the wind turbine rotor blade acts on the measurement portion of optical fibre and causes the length of the first optical path to change, wherein the optical fibre comprises a second optical path, separate from the measurement portion of the optical fibre and not subject to deformation of the wind turbine rotor blade;

a light source for inputting light into one end of the fibre;

a light detector for receiving light that has passed along the first optical path, and for providing an output to the controller indicating the intensity of the received light; and a controller coupled to the light detector for determining, based on the detected light, the length of the first optical path;

wherein the second optical path includes a non-deformation measurement portion of optical fibre, separate to the measuring portion, and a mirror terminating the non-deformation measurement optical fibre portion, and the system comprises:

a mirror terminating the measurement portion of the optical fibre; and an optical coupler for splitting the light received from the light source between the measurement and non-measurement portions of the fibre, and for receiving and combining the light reflected from both measurement and non-deformation measurement portions of the fibre.

10. The wind turbine of claim 9, wherein the non-measurement portion of the fibre is isolated from deformation of the wind turbine rotor blade to provide for temperature compensation, the lengths of the measurement and non-measurement portions of the optical fibre and the measurement portion of the fibre being long in comparison to other optical distances in the sensor.

11. A wind turbine comprising an optical sensor system for detecting the deformation of a wind turbine rotor blade, the system comprising:

an optical fibre having a first optical path provided in a measurement portion of the fibre, the fibre operatively attached to the wind turbine rotor blade such that deformation of the wind turbine rotor blade acts on the measurement portion of optical fibre and causes the length of the first optical path to change, wherein the optical fibre comprises a second optical path, separate from the measurement portion of the optical fibre and not subject to deformation of the wind turbine rotor blade;

a light source for inputting light into one end of the fibre;

a light detector for receiving light that has passed along the first optical path, and for providing an output to the controller indicating the intensity of the received light;

a controller coupled to the light detector for determining, based on the detected light, the length of the first optical path;

a partial mirror for splitting the light into the first and second optical paths; and a mirror terminating the measurement portion of the optical fibre;

wherein the partial mirror allows the light reflected from the measurement portion of the optic fibre to pass through to the light detector.

12. A method of detecting the temperature compensated deformation of a wind turbine rotor blade, comprising:

attaching a first optical fibre, having a deformation measurement optical path, to a wind turbine rotor blade such that deformation of the component acts on the first optical fibre and causes the length of the deformation measurement optical path to change;

attaching a second optical fibre, having a non-deformation measurement optical path, to the wind turbine rotor blade such that it is isolated from deformation of the wind turbine rotor blade;

inputting, using a light source, a light signal into the first and second optical fibres;

detecting, using a detector, light that has passed along the deformation measurement and non-deformation measurement optical paths;

based on the detected light, calculating the difference in lengths of the deformation measurement and non-deformation measurement optical paths;

terminating the first optical fibre in a mirror;

terminating the second optical fibre in a mirror; and connecting the first and second optical fibre to an optical coupler for splitting the light received from the light source into the deformation measurement and non-deformation measurement optical paths, and for receiving and combining the light reflected from first and second optical fibres.

13. The method of claim 12, comprising providing first and second optical fibres that are long in comparison to other optical lengths between the optical coupler, the light source and the detector.

14. A method of measuring the deformation of a wind turbine rotor blade, comprising:

attaching an optical fibre, having a first optical path provided in a measurement portion of the fibre, to a wind turbine rotor blade such that deformation of the wind turbine rotor blade acts on the measurement portion of optical fibre and causes the length of the first optical path to change, wherein the optical fibre includes a second optical path, separate from the measurement portion of the fibre and not subject to deformation of the wind turbine rotor blade;

inputting, using a light source, light into one end of the fibre;

splitting, using a light splitting device, the light into the first and second optical paths;

adding, using a light adding device, light from the measurement portion of the first optical path and light directly from the light splitting device;

detecting, using a detector, light that has passed along the first and second optical paths; and determining, based on the detected light, the length of the first and second optical paths.

* * * * *